(12) United States Patent
Ritter et al.

(10) Patent No.: US 9,468,148 B2
(45) Date of Patent: Oct. 18, 2016

(54) FEEDERHOUSE ARRANGEMENT FOR MOUNTING A HEADER TO A COMBINE

(71) Applicant: DEERE & COMPANY, Moline, IL (US)

(72) Inventors: Aaron S. Ritter, Milan, IL (US); Ryan P. Mackin, Milan, IL (US)

(73) Assignee: Deere & Company, Moline, IL (US)

( * ) Notice: Subject to any disclaimer, the term of this patent is extended or adjusted under 35 U.S.C. 154(b) by 151 days.

(21) Appl. No.: 14/473,792

(22) Filed: Aug. 29, 2014

(65) Prior Publication Data

US 2016/0057935 A1    Mar. 3, 2016

(51) Int. Cl.
  *A01D 41/16* (2006.01)
  *A01F 12/10* (2006.01)
  *A01D 41/14* (2006.01)

(52) U.S. Cl.
  CPC .............. *A01F 12/10* (2013.01); *A01D 41/14* (2013.01); *A01D 41/16* (2013.01)

(58) Field of Classification Search
  USPC .................. 56/14.5, 15.6, 208, 209, DIG. 9
  See application file for complete search history.

(56) References Cited

U.S. PATENT DOCUMENTS

| | | | | |
|---|---|---|---|---|
| 3,638,407 | A | * | 2/1972 | Togami ................. A01D 41/16 56/15.6 |
| 4,266,391 | A | * | 5/1981 | McDuffie ............... A01D 41/16 56/14.5 |
| 4,266,392 | A | | 5/1981 | Knepper et al. |
| 7,234,291 | B2 | * | 6/2007 | Rickert .................. A01D 69/00 56/12.6 |
| 8,826,635 | B2 | * | 9/2014 | Schraeder ............ A01D 41/145 56/10.2 E |

FOREIGN PATENT DOCUMENTS

| | | |
|---|---|---|
| EP | 0448844 A1 | 10/1991 |
| EP | 1092341 A1 | 4/2001 |
| EP | 2764765 A1 | 8/2014 |

OTHER PUBLICATIONS

European Patent Office, Extended European Search Report for European Patent Application No. 15178256.2-1655 mailed Jan. 20, 2016.

* cited by examiner

*Primary Examiner* — Alicia Torres
(74) *Attorney, Agent, or Firm* — Lorenz & Kopf, LLP

(57) ABSTRACT

A feederhouse for attaching a header to an agricultural combine has a sill plate that supports a support beam of the header during operation of the header. A mounting hook with a hooked end is supported for forward and rearward movement with respect to the sill plate. A locking pin is configured to lock the mounting hook at either of a first position and a second position with respect to the sill plate. When the support beam is supported by the sill plate and the mounting hook is locked in the first position, the header is disposed at a first angle with respect to the feederhouse. When the support beam is supported by the sill plate and the mounting hook is locked in the second position, the header is disposed at a second angle with respect to the feederhouse.

11 Claims, 10 Drawing Sheets

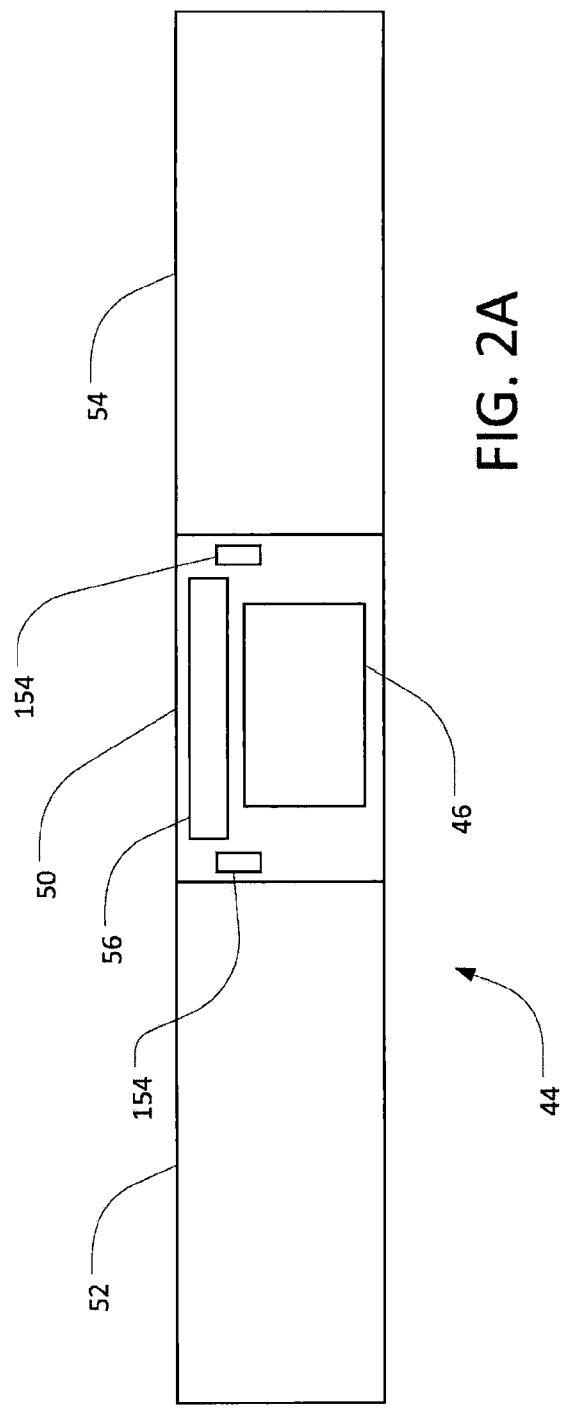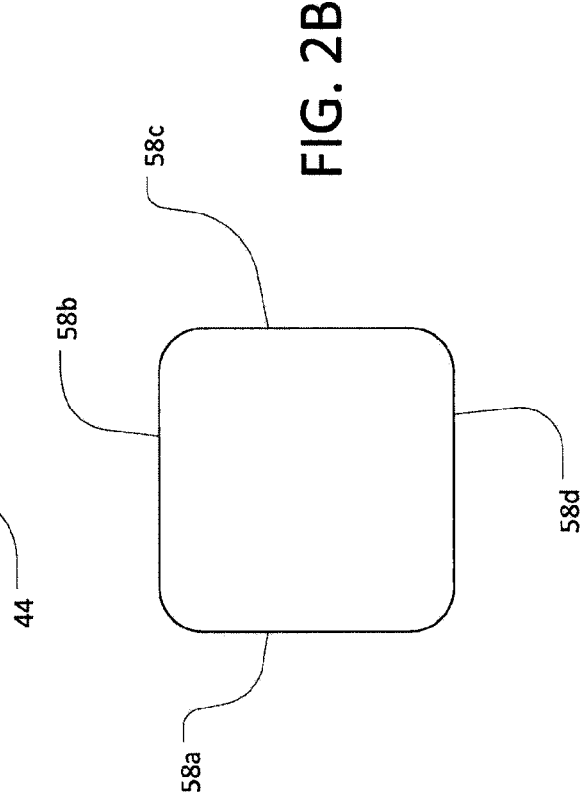

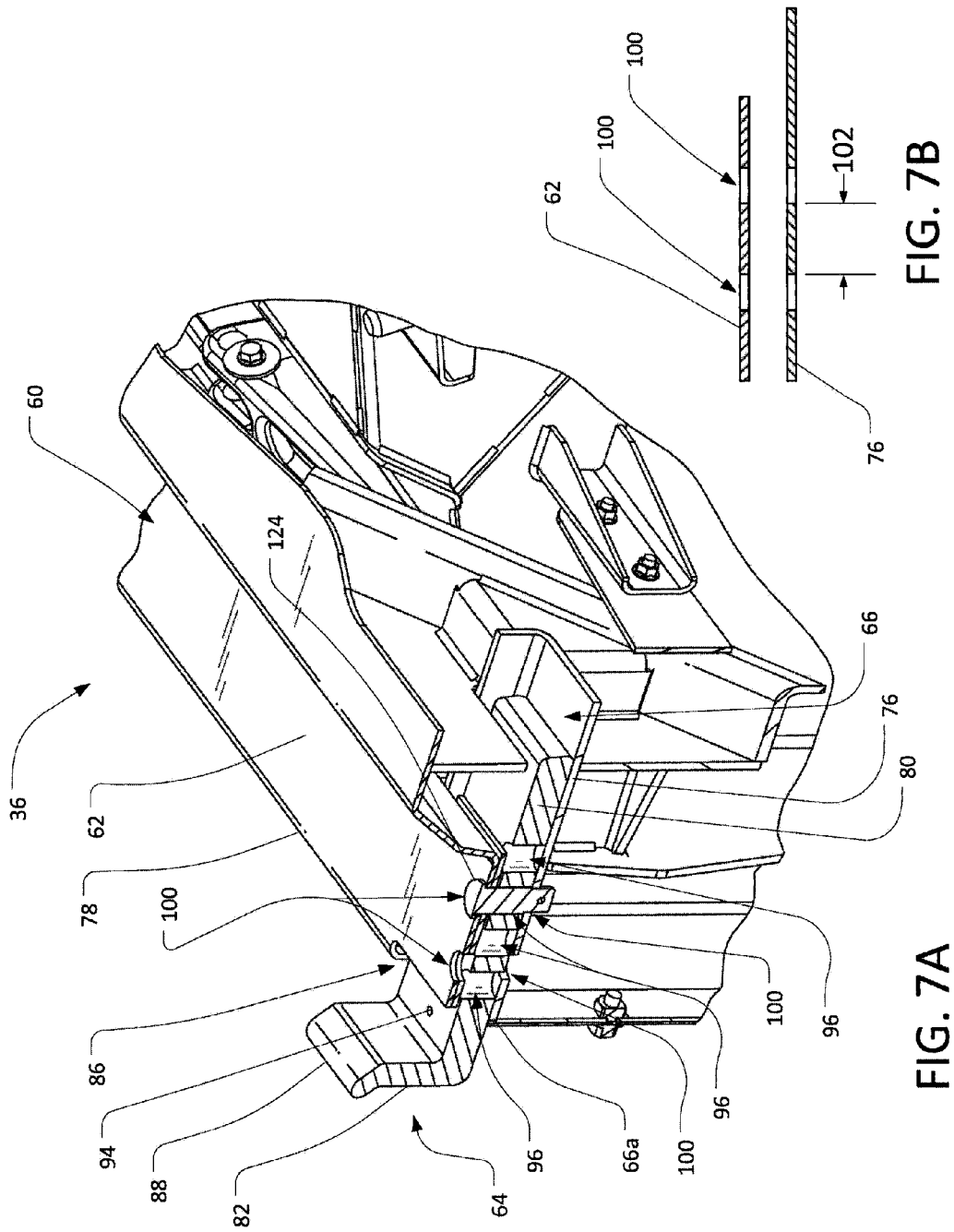

FEEDERHOUSE ARRANGEMENT FOR MOUNTING A HEADER TO A COMBINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to agricultural combines, including arrangements of a feederhouse for mounting a header to a combine.

BACKGROUND OF THE DISCLOSURE

Agricultural combines or "combines" are large self-propelled machines for harvesting and processing crop material. Typical combines are configured with a main body supported by a chassis. The chassis is supported above the ground by one or more wheels (or tracks), which may be configured in different ways (e.g., with different numbers, sizes, or types of wheels).

Changing the configuration of the wheels for a particular combine may change the height (or angle) of the chassis of the combine, with respect to the ground. This may also change the distance (or angle) of devices and structures attached to the chassis with respect to the ground.

A feederhouse for attaching a header to the chassis is typically attached with a pivot mount to a forward end of the chassis. A header is typically configured to attach at a forward end of the feederhouse, such that pivoting the feederhouse at the pivot mount disposes the header at different positions. Hydraulic actuators attached to the chassis may be used to pivot the feederhouse, with respect to the chassis, to dispose an attached header at a particular height from the ground.

A typical header includes a rigid central support structure, which is configured to attach to a feederhouse for operation of the header. Arms of the header extend laterally away from the support structure, and carry various harvesting devices that cut and gather crop.

During operation of the header, the central support structure is attached to the forward end of the feederhouse, with the header oriented at a particular angle, with respect to the feederhouse. When the header is attached to the feederhouse, the arms of the header extend laterally past the lateral sides of the feederhouse. With the header attached, the feederhouse is pivoted at the pivot mount, in order to dispose the header at a particular height from the ground. The combine then travels over a field, with the harvesting devices of the header cutting and gathering crop material.

Certain harvesting devices, including cutting devices, may operate more effectively when disposed at a particular angle with respect to the ground. Harvesting devices are typically attached to the header at one or more fixed angles, and the header is supported with respect to the ground by the feederhouse. Accordingly, the angle of a header with respect to the ground may be changed by adjusting the angle of a header with respect to a feederhouse. It may be useful, accordingly, to provide a feederhouse arrangement for adjusting the angle of an attached header with respect to the feederhouse.

In known arrangements, a tilt assembly attached to the feederhouse may allow an operator to change the angle of a header with respect to the feederhouse. Known tilt assemblies may include a metal frame pinned to lateral sides of the chassis, such that the frame can be pivoted a number of degrees about the pin. The frame may be bolted at a particular pivot angle, and the header may be attached to the frame for operation. Accordingly, the angle of the header with respect to the feederhouse (and, thereby, with respect to the ground) may be set by the frame.

Known tilt assemblies may be complex, however, and may be relatively expensive to manufacture and maintain. Accordingly, it may be useful to provide alternative feederhouse arrangements for adjusting the angle of an attached header.

SUMMARY OF THE DISCLOSURE

A feederhouse is disclosed for attaching a header to an agricultural combine.

According to one aspect of the disclosure, a sill plate is attached to a feederhouse, wherein the sill plate supports a support beam of the header during operation of the header. A mounting hook with a hooked end is supported for forward and rearward movement of the mounting hook with respect to the sill plate. A locking pin is configured to lock the mounting hook at either of a first position and a second position. When the support beam is supported by the sill plate and the mounting hook is locked in the first position, the header is disposed at a first angle with respect to the feederhouse. When the support beam is supported by the sill plate and the mounting hook is locked in the second position, the header is disposed at a second angle with respect to the feederhouse.

In certain embodiments, with the mounting hook in the first position, the hooked end of the mounting hook may be disposed a first distance forward of the sill plate. With the mounting hook in the second position, the hooked end of the mounting hook may be disposed a second, longer distance forward of the sill plate.

With the mounting hook in the first position and the header supported by the feederhouse for operation, a lower surface of the support beam may be supported by an upper surface of the sill plate with the lower surface of the support beam disposed in parallel with the upper surface of the sill plate. With the mounting hook in the second position and the header supported by the feederhouse for operation, the lower surface of the support beam may be supported by the upper surface of the sill plate with the lower surface of the support beam disposed at an oblique angle with respect to the upper surface of the sill plate.

A sleeve may be attached to the feederhouse, wherein the sleeve is configured to support the mounting hook at the first position and the second position. The sleeve may be disposed below the sill plate, wherein an upper wall of the sleeve may be formed by the sill plate.

A plurality of holes may extend through the mounting hook. A plurality of holes may extend through the sleeve. Disposing the locking pin within one of the holes through the mounting hook and one of the holes through the sleeve may lock the mounting hook at the first position or the second position. Two of the holes through the mounting hook may be spaced from each other by a first distance, and two of the holes through the sleeve may be spaced from each other by a second, different distance. Four of the holes through the mounting hook may be spaced serially by the second distance.

The mounting hook may be angled forwardly at the hooked end, with respect to the feederhouse.

With the header supported for operation by the mounting hook, a gap may be formed between the feederhouse and the header at a lateral side of the feederhouse. A side panel may be disposed at the lateral side of the feederhouse, the side panel being adjustable to block the gap with the header at the first angle or the second angle. A first end of the side panel may be pivotally attached to the feederhouse, such that the side panel can be pivoted to block the gap. A second locking pin may be configured to lock the second end of the side panel in position, relative to the feederhouse.

A stop plate may be attached to the second end of the side panel, the stop plate abutting the header when the header is supported by the feederhouse for operation. The stop plate may be attached at the upper end of the side panel, and may be configured with a right-angle bend.

With the header supported for operation by the mounting hook, a gap may be formed between the feederhouse and the header at a lateral side of the feederhouse. A stop plate may be attached to the feederhouse, the stop plate extending across the gap to abut the header when the header is supported by the feederhouse for operation The details of one or more embodiments are set forth in the accompanying drawings and the description below. Other features and advantages will become apparent from the description, the drawings, and the claims.

BRIEF DESCRIPTION OF THE DRAWINGS

FIG. 2A is a schematic rear view of the header of FIG. 1;

FIG. 2B is a schematic side view of a support beam of the header of FIG. 1;

FIG. 7A is a partial perspective view of the forward end of the feederhouse of FIG. 1, showing a section taken along plane A-A of FIG. 3;

FIG. 7B is a schematic sectional view of the upper and lower plates of the sleeve of FIG. 4, taken along plane A-A of FIG. 3;

Like reference symbols in the various drawings indicate like elements.

DETAILED DESCRIPTION

Figure 1:
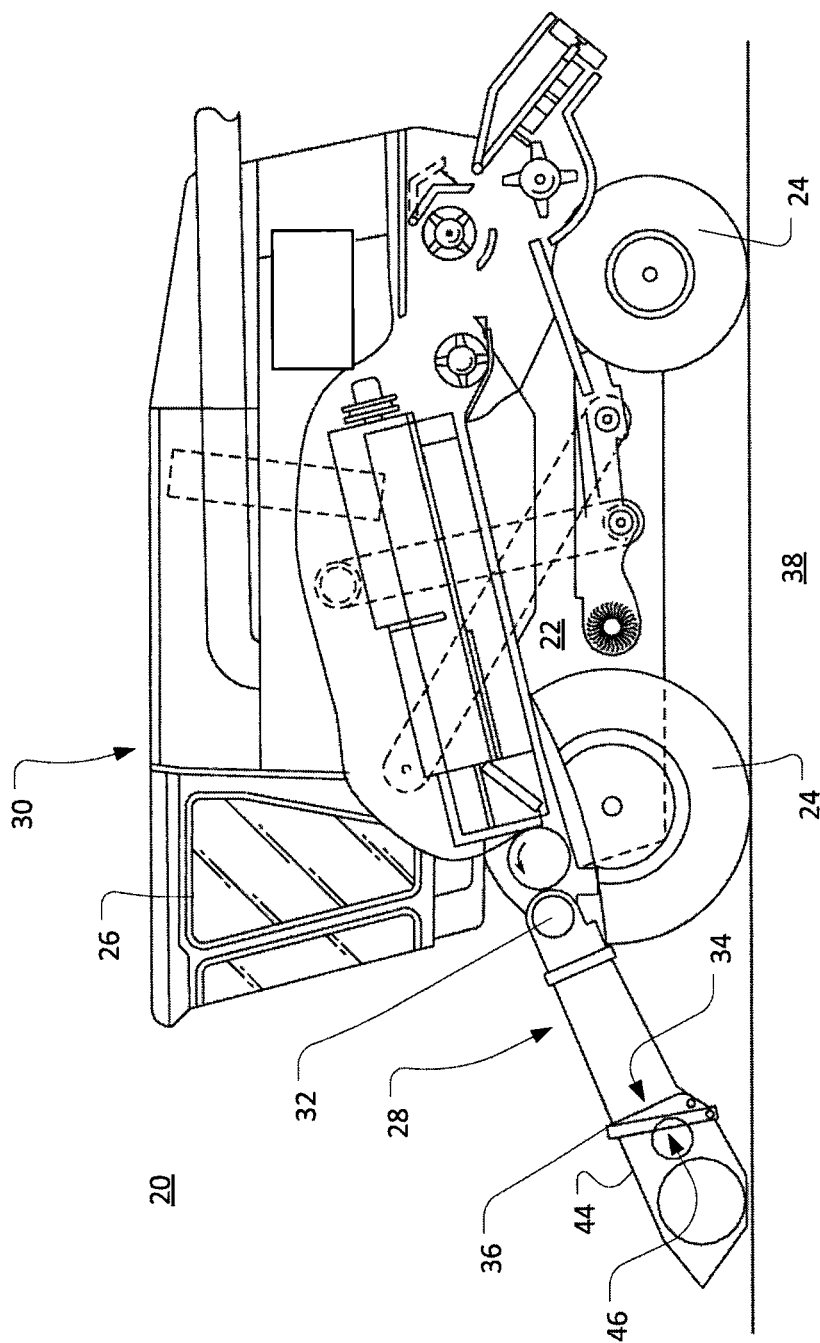
FIG. 1 is a side view of an example agricultural combine with a feederhouse and a header attached to the feederhouse.

The following describes one or more example embodiments of the disclosed feederhouse for attaching a header an agricultural combine, as shown in the accompanying figures of the drawings described briefly above. Various modifications to the example embodiments may be contemplated by one of skill in the art.

The term "beam," as used herein, means a rigid structure for providing strength or support to another structure or device. A beam may be configured as an a solid bar, as a structure of plates that have been welded together, as a rod or tube, or in other similar ways.

With respect to an agricultural combine, the terms "transverse," "lateral," "side-to-side," or the like, may refer to a generally horizontal direction that is at an oblique or right angle to a forward (or rearward) direction of the combine.

The term "wheel," as used herein, means any of sprocket, pulley, or similar component that is configured to receive or transmit rotational power.

The term "pin," as used herein, means any of a rod, cylinder, threaded fastener (e.g., bolt or screw), peg (including rectangular pegs), bar, or similar device for connecting different objects.

As noted above, in typical agricultural combines (or "combines"), a pivoting feederhouse extends forward from the main body of the combine. A header is attached to a forward end of the feederhouse, such that crop material gathered by the header is moved from the header, through the feederhouse, to the main body of the combine. In the main body, additional devices further process the crop material to separate grain and non-grain (or other) portions.

Also as noted above, it may be useful to adjust the angle of a header with respect to a feederhouse supporting the header, such that the header is disposed at an appropriate angle with respect to the ground during operation of the header. Among other benefits, the feederhouse arrangement disclosed herein may be useful in this regard.

In certain embodiments, a sleeve may be attached to a feederhouse of a combine. A mounting hook with a hooked end may be configured to slide within the sleeve between different positions, in order to dispose the hooked end at different distances forward of the feederhouse (e.g., at different distances forward of a sill plate of the feederhouse). A locking device may be configured to secure the mounting hook at the different positions, and thereby secure the hooked end of the mounting hook at the different distances forward of the feederhouse.

When a header with a support beam is supported for operation by the feederhouse, the different positions of the mounting hook may dispose the support beam (and, accordingly, the header) at different angles with respect to the feederhouse. In a feederhouse with a sill plate, for example, the hooked end of the mounting hook may help to retain a support beam of a header on the sill plate during operation of the header. With the hooked end disposed at different distances forward of the sill plate, the support beam may be retained on the sill plate with the support beam (and, accordingly, the header) disposed at different angles, with respect to the sill plate. Accordingly, by adjusting the position of the mounting hook within the sleeve, an operator may dispose the support beam (and the header) at a particular angle with respect to the feederhouse and with respect to the ground.

Referring to FIG. 1, an example agricultural combine 20 is depicted. As depicted in FIG. 1, a forward direction of the combine 20 is to the left, and a rearward direction of the combine 20 is to the right. Accordingly, a lateral direction, with respect to the combine 20, may extend into or out of the page.

A chassis 22 of the combine 20 is supported by various wheels 24 or similarly disposed tracks (not shown). A cab 26 is supported by the chassis 22 to house an operator of the combine 20. A feederhouse 28 is attached to a main body 30 of the combine 20 at a pivot mount 32. An inlet opening 34 is disposed at a forward (i.e., to the left in FIG. 1) end 36 of the feederhouse 28.

Different configurations of the wheels 24 (or tracks) may be possible, such that the chassis 22 is supported at different heights with respect to the ground 38. Accordingly, for different configurations of the wheels 24, the pivot mount 32 and the feederhouse 28 may be oriented at different heights from the ground 38. This may result in the forward end 36 of the feederhouse being disposed at different angles, with respect to the ground 38, when the feederhouse 28 is pivoted to dispose the forward end 36 at a particular height from the ground 38.

A header 44 is attached for operation at a forward end 36 of the feederhouse 28. Referring also to FIG. 2A, the header 44 may include central support structure 50, with arms 52 and 54 extending laterally away from the support structure 50. The support structure 50 defines an outlet opening 46, which opens to the rear of the support structure 50 (i.e., out of the page in FIG. 2A). A support beam 56 of the header 44 generally extends laterally across the support structure 50 (or a portion thereof).

As depicted in FIG. 2B, the support beam 56 is configured as an extended box of welded or cast metal plates 58a through 58d, with a hollow interior space therebetween. Other configurations, however, may be possible. For example, a support beam may be formed as a solid metal bar, or another rigid body extending laterally along the header 44. In certain embodiments, a support beam (including the support beam 56) may be formed with multiple distinct sections, which may or may not be in direct contact with each other. For example, a first distinct section of a support beam may be configured to support the header 44 at a first side of the header 44, and a second distinct section of a support beam may be configured to support the header 44 at a second, different side of the header 44.

Figure 3:
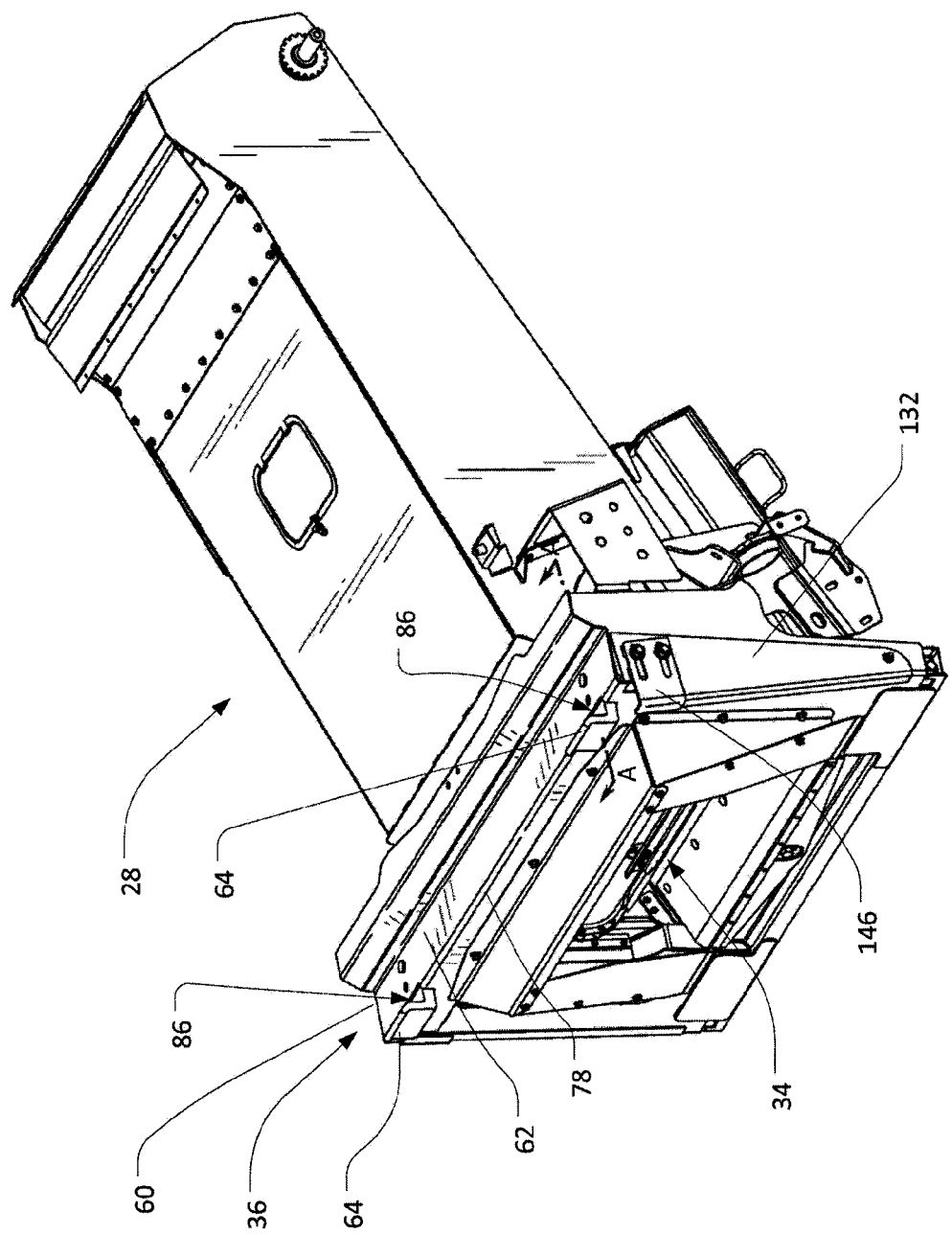
FIG. 3 is a perspective view of the feederhouse of FIG. 1.

Referring also to FIG. 3, mounting hooks 64 attached to the forward end 36 of the feederhouse 28 are configured to seat on the support beam 56 to allow the feederhouse 28 to lift the header 44 off of the ground. An operator may align the mounting hooks 64 with the support beam 56, when the header 44 is on the ground, then pivot the feederhouse 28 upward to lift the header 44 with the mounting hooks 64 (or other features of the feederhouse 28).

Generally, a header may be supported by an upper plate on a feederhouse known as a "sill plate." Referring also to FIG. 3, a sill plate 60 with a relatively flat upper support surface 62 and a forward lip 78 is attached (e.g., welded or bolted) to the feederhouse 28 near the mounting hooks 64. (As depicted, the sill plate 60 also includes various angled portions, reinforcement structures, and so on.) When the header 44 is attached to the feederhouse 28 for operation, the support beam 56 of a header 44 is supported by the sill plate 60 (see, e.g., FIGS. 8A and 8B). For example, when an operator pivots the feederhouse 28 to lift the header 44, the support beam 56 of the header 44 may be moved rearward from the mounting hooks 64 to the sill plate 60.

In certain embodiments, a sill plate may be configured to support a majority of the weight of a header during operation. For example, when the header 44 is attached to the feederhouse 28, the lower plate 58d of the support beam 56 may be seated on the support surface 62 of the sill plate 60, such that the sill plate 60 supports most (or all) of the weight of the header 44. In certain embodiments, the mounting hooks 64 may additionally (or alternatively) support the weight of the header 44, as discussed in greater detail below.

Figure 4:
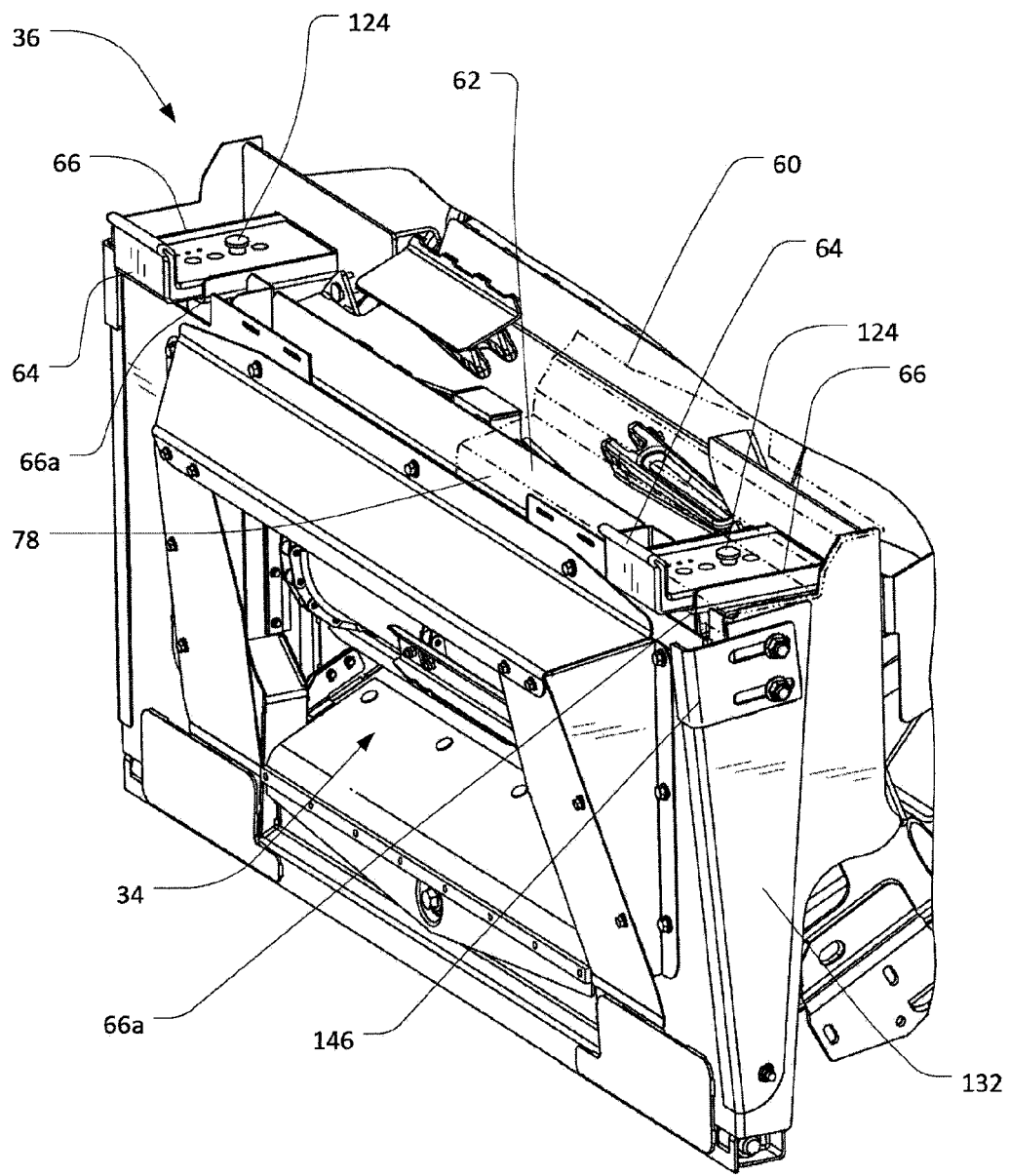
FIG. 4 is an enlarged partial perspective view of the forward end of the feederhouse of FIG. 1, including a sleeve attached to the feederhouse.

Referring also to FIG. 4, the forward end 36 of the feederhouse 28 is depicted, with a portion of the sill plate 60 shown in phantom. (A portion of the sill plate 60 has been entirely removed from the view of FIG. 4.) A sleeve 66 is disposed at each side of the inlet opening 34, in order to support the mounting hooks 64 with respect to the feederhouse 28. In the embodiment depicted, two sleeves 66 are provided, for support of the two mounting hooks 64. It will be understood, however, that other numbers of mounting hooks and sleeves may be utilized, and that the sleeves 66 may be disposed at various other locations on the feederhouse 28. (In the embodiment depicted, similar mounting hooks 64 are utilized for each sleeve 66. As such, for convenience, only one hook 64 may be referred to in certain examples herein.)

Generally, a sleeve (e.g., the sleeve 66) and a mounting hook (e.g., the mounting hook 64) are configured such that the sleeve supports the mounting hook with respect to the feederhouse when the mounting hook is inserted into the sleeve. Further, because the mounting hook may be disposed at different positions within a sleeve, the sleeve may support the mounting hook in various different positions. Locking devices of various configurations may be provided to lock the hook in a particular position within the sleeve. As depicted in FIG. 4, for example, locking pins 124 are configured to lock the mounting hooks 65 at various positions within the sleeves 66.

Figure 5:
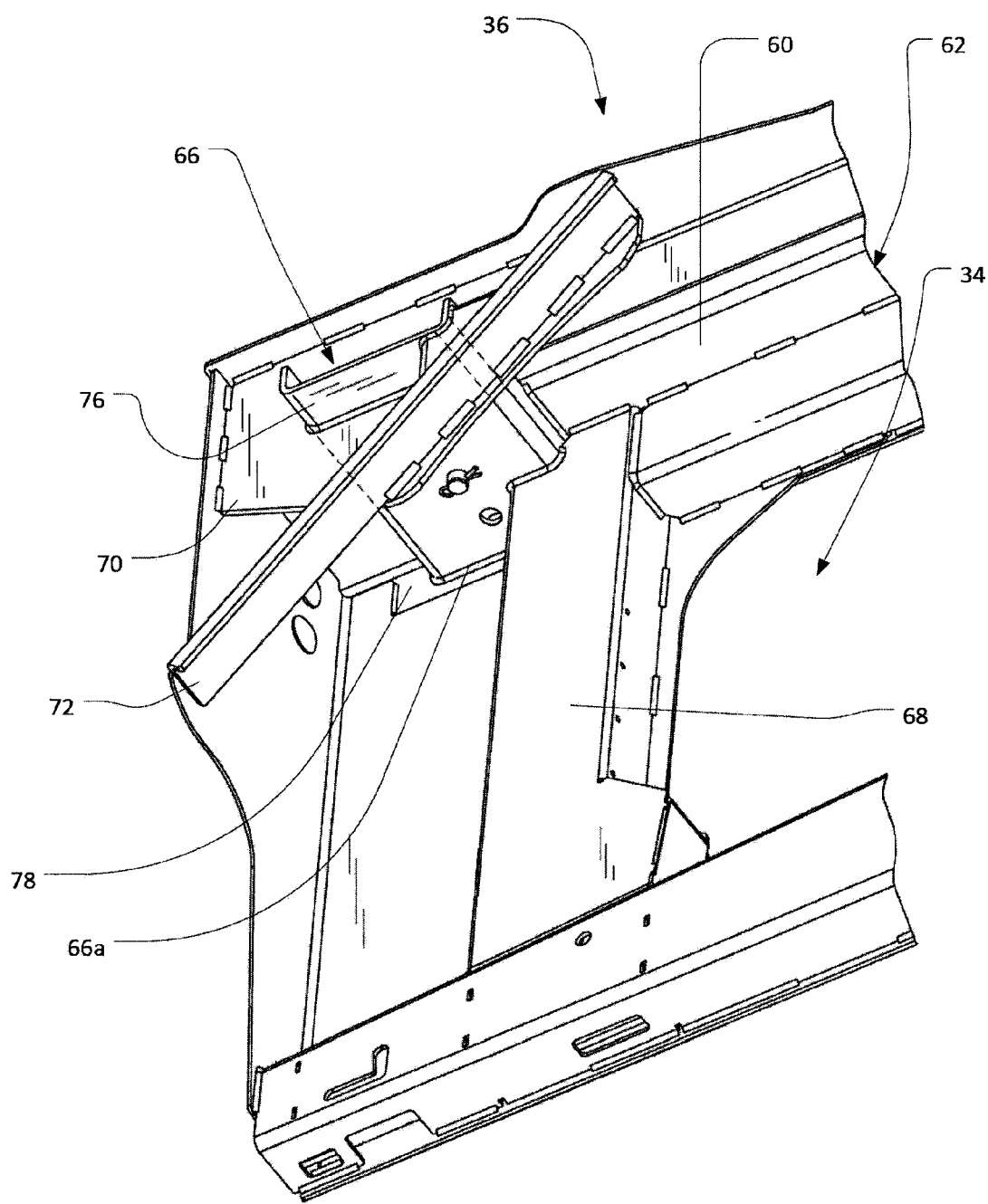
FIG. 5 is a partial rear perspective view of the forward end of the feederhouse of FIG. 1, including the sleeve of FIG. 4.

Referring also to FIG. 5, each of the example sleeves 66 is constructed from a metal plate 76 that has been formed (e.g., forged, stamped, or cast) into a generally u-shaped channel. The metal plate 76 may be attached (e.g., welded, riveted, bolted, pinned, screwed, and so on) to support structures of the feederhouse 28 in order to dispose the sleeve 66 in various locations.

As depicted, the plate 76 is attached below support surface 62 of the sill plate 60, such that the plate 76 and the sill plate 60 together define the sleeve 66. In this way, the sleeve 66 exhibits a generally rectangular cross section and extends generally front-to-back with respect to the feederhouse 28. Also as depicted, a forward end 66a of the sleeve 66 is aligned with a forward lip 78 of the sill plate 60. Accordingly, front openings 86 in the sill plate 60 are provided (see FIG. 3) for insertion of the mounting hook 64 into the sleeve 66. It will be understood that other configurations are possible, including with respect to the position, shape, size, and materials of the sleeve 66.

Figure 6:
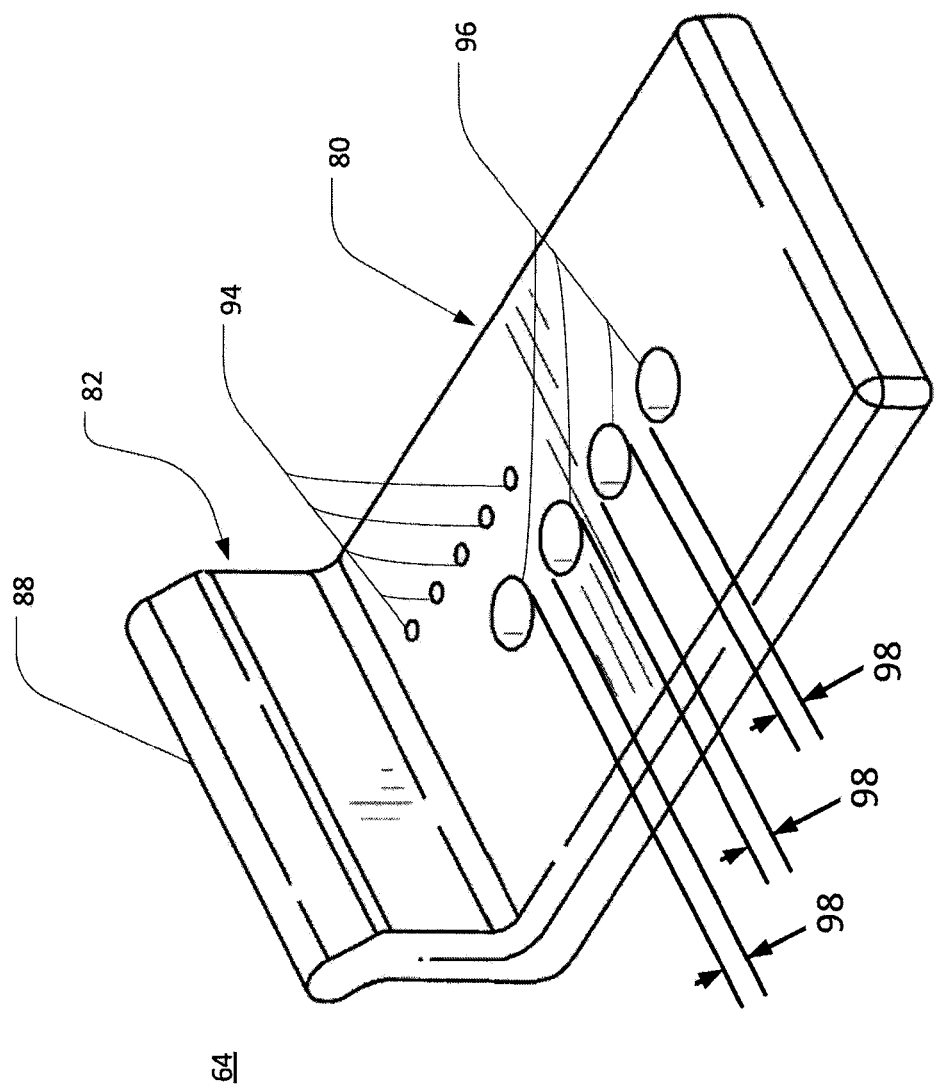
FIG. 6 is a perspective view of a mounting hook of the feederhouse of FIG. 1.

In certain embodiments, the plate 76 of the sleeve 66 may be welded (or otherwise attached) to the sill plate 60. The plate 76 may additionally (or alternatively) be attached to various other support structures. For example, as depicted in FIG. 6, the plate 76 is welded to a vertically oriented support beam 68, and to a support plate 70, through which the sleeve 66 extends. The support plate 70 is itself reinforced with a support beam 72, which may be welded to the body of the feederhouse 28.

Generally, a mounting hook (e.g., the mounting hook 64) may include a hooked end, and a body configured to slide within a sleeve. Referring also to FIG. 6, for example, the mounting hook 64 is formed (e.g., cast or forged) with an extended body 80 and a hooked end 82. The hooked end 82 of the mounting hook 64 is configured to support the support beam 56 of the header 44 as the feederhouse 28 pivots to lift the header 44 from the ground, as described above. With the support beam 56 of the header 44 supported for operation by the sill plate 60, the hooked end 82 also serves to retain the header on the sill plate 60.

In different embodiments, hooked ends of mounting hooks may be oriented at various different angles with respect to the bodies of the mounting hooks. The hooked end 82 of the mounting hook 64, for example, is depicted as forming an angle of approximately 90° with body 80 of the mounting hook 64. Other angles, however, may be possible.

In the embodiment depicted, the hooked end 82 of the mounting hook 64 exhibits a generally similar cross section as the body 80 of the mounting hook 64, except at a tip 88 of the hooked end 82. This may simplify manufacturing, for example, by reducing the number of different dimensions for the mounting hook 64. Other configurations are possible, however, including configurations with the hooked end 82 having a different cross section from the body 80.

Other features may also be included. In the embodiment depicted, for example, the tip 88 of the hooked end 82 of the mounting hook 64 is angled away from the body 80 of the mounting hook 64 such that the tip 88 is angled forwardly, with respect to the feederhouse 28, when the hook 64 is supported by the sleeve 66. As a result, when the mounting hook 64 is used to lift the header 44 from the ground, the support beam 56 may seat properly on the mounting hook 64 (and the sill plate 60) even if the hooked end 82 is not perfectly aligned with the support beam 56. For example, if the tip 88 is aligned directly below the support beam 56 at the start of a lifting operation, the forward angle of the tip 88 may tend to cause the support beam 56 (and the header 44) to slide rearward past the tip 88. In this way, the support beam 56 may tend to slide rearward onto the mounting hook 64 (and the sill plate 60) for lifting, rather than forward off of the mounting hook 64.

The body 80 of the mounting hook 64 includes a number of holes 96 extending through the mounting hook 64. As depicted, for example, the mounting hook 64 includes four holes 96 that are arrange serially, and spaced from each other, respectively, by a first distance 98. Also as depicted, the four holes 96 extend entirely through the mounting hook 64. Other configurations are also possible, however. For example, a different number of holes 96 may be provided on the mounting hook 64, or various of the holes 96 may be spaced from each other by a different distance than the first distance 98. In certain embodiments, various of the holes 96 may extend only part of the way through the mounting hook 64 (i.e., may be "blind" holes).

The mounting hook 64 also includes a number of graduated reference marks 94. When the hook 64 is inserted into the sleeve 66, the location of the reference marks 94 relative to the lip 78 of the sill plate 60 may provide a visual indicator of how far into (and out of) the sleeve 66 the mounting hook 64 extends. Accordingly, the reference marks 94 may also provide a visual indicator of how far forward of the lip 78 the hooked end 82 is disposed. As depicted, the reference marks 94 are formed as small blind holes or indents in the upper surface of the body 80 of the mounting hook 64. Other configurations are also possible.

Referring also to FIG. 7A, when the extended body 80 of the mounting hook 64 is inserted into the sleeve 66, the sleeve 66 supports the mounting hook 64 with respect to the feederhouse 28. Accordingly, the mounting hook 64 may be used to support the header 44 with respect to the feederhouse 28 when the mounting hook 64 is inserted into the sleeve 66. Further, because the extended body 80 of the mounting hook 64 is configured to slide within the sleeve 66, the mounting hook 64 may be supported by the sleeve 66 with the hooked end 82 disposed at different distances forward of a forward edge 84 of the sill plate 60 (or, similarly, at different distances forward of another feature on the feederhouse 28).

A locking device may be provided on the feederhouse 28 in order to lock the mounting hook 64 in a particular position with respect to the sleeve 66. In certain embodiments, for example, various holes 100 are formed in the plate 76 of the sleeve 66 as well as in the sill plate 60 (or are otherwise formed in the sleeve 66). A locking pin 124 may be inserted into one of the holes 100 and one of the holes 96 (in the body 80 of the mounting hook 64), in order to lock the mounting hook 64 at a particular position with respect to the sleeve 66. The locking pin 124 may also be inserted into a different combination of one of the holes 100 and one of the holes 96, in order to lock the mounting hook 64 at a different position with respect to the sleeve 66.

Referring also to FIG. 7B, in certain embodiments, the holes 100 in the sleeve 66 may be spaced from each other by a second distance 102 that is different from the distance 98 between the holes 96 in the mounting hook 64. In this way, the mounting hook 64 may be locked at a relatively large number of positions within the sleeve 66. In the embodiment depicted, for example, the two holes 100 in the sleeve 66 and the four holes 96 in the mounting hook 64 may allow the mounting hook 64 to be locked at one of five (or more) different positions within the sleeve 66.

Figure 8A:
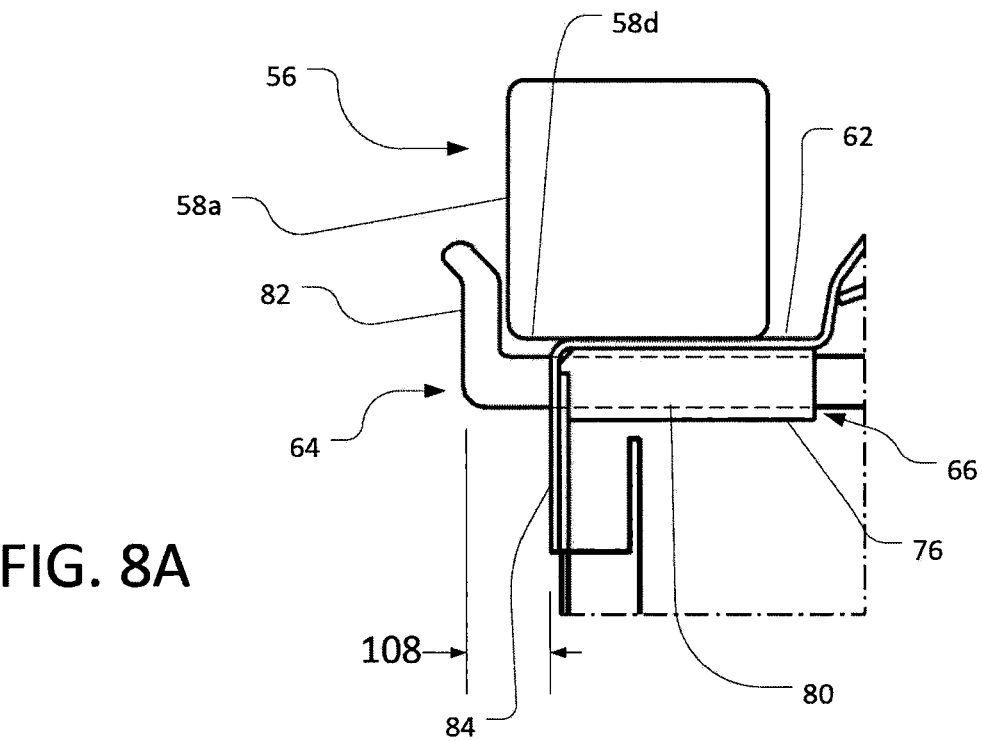
FIGS. 8A and 8B are schematic side views of the support beam of FIG. 2B supported by the feederhouse of FIG. 1.

Generally, disposing (and locking) a hooked end of a mounting hook at different distances forward of a forward end of a feederhouse (or another feature of the feederhouse, such as an attached sill plate) may cause the feederhouse to support the header at different angles with respect to the feederhouse. Referring also to FIG. 8A, for example, with the mounting hook 64 at a first position within the sleeve 66, the hooked end 82 is disposed in at a relatively small distance 108 from the forward edge 84 of the sill plate 60.

In such a configuration, when the header 44 is supported for operation by the feederhouse 28, the hooked end 82 prevents the support beam 56 from moving forward off of the sill plate 60 (i.e., to the left in FIG. 8A). Accordingly, the support surface 62 of sill plate 60 supports the support beam 56 with a lower plate 58*d* of the support beam 56 disposed in parallel with an upper support surface 112 of the sill plate 60 (on which the lower plate 58*d* rests). Because the support beam 56 is rigidly connected to the header 44, this results in the header 44 being disposed at a particular angle with respect to the feederhouse 28. For example, with the support beam 45 supported by the sill plate 60 as depicted in FIG. 8A, beams or plates (not shown in FIG. 8A) of the header 44 that are disposed in parallel with plate 58*a* of the support beam 56 are disposed perpendicularly to the support surface 62. For a particular configuration of the wheels 24, this may usefully orient a cutting device (or other device) of the header 44 at a particular angle with respect to the ground.

Figure 8B:
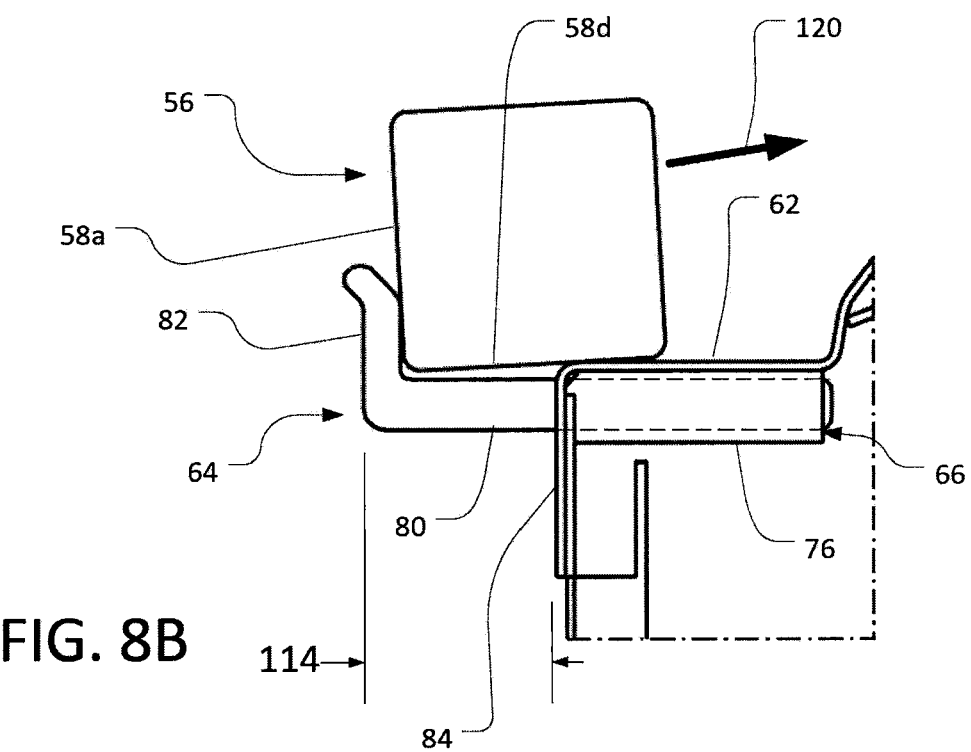

In contrast, FIG. 8B depicts the mounting hook 64 disposed at a second position within the sleeve 66. In this second position of the mounting hook 64, the hooked end 82 is disposed at a distance 114 from the forward edge 84 of the sill plate 60, with the distance 114 being longer than the distance 108 (see FIG. 8A). In such a configuration, when the header 44 is supported for operation by the feederhouse 28, the hooked end 82 allows the support beam 56 to move somewhat forward off of the sill plate 60, as compared to the position of the support beam 56 in FIG. 8A. Accordingly, the sill plate 60 supports the support beam 56 with a lower surface 110 of the support beam 56 disposed at an oblique (i.e., non-parallel) angle with respect to the upper surface 112 of the sill plate 60. This results in the header 44 being disposed at a different angle with respect to the feederhouse 28 (as compared to the angle of the header 44 in the configuration of FIG. 8A). For example, with the support beam 45 supported by the sill plate 60 as depicted in FIG. 8B, beams or plates (not shown in FIG. 8B) of the header 44 that are disposed in parallel with plate 58a of the support beam 56 are disposed at an oblique angle with respect to the support surface 62. For a particular configuration of the wheels 24, this may usefully orient a cutting device (or other device) of the header 44 at another particular angle with respect to the ground.

Two different positions of the mounting hook 64 are depicted in FIGS. 8A and 8B, which may result in two different angles of the header 44 with respect to the feederhouse 28 (and the ground). It will be understood that other positions of the mounting hook 64 and other angles of the header 44 are possible. For example, as also noted above, the holes 100 in the sleeve 66 and the holes 96 in the mounting hook 64 (see, e.g., FIGS. 7A and 7B) may allow the mounting hook 64 to be locked at one of five (or more) different locking positions within the sleeve 66.

In either of the configurations depicted in FIGS. 8A and 8B, a substantial portion of the weight of the header 44 may be supported by the sill plate 66 (or another similar feature of the feederhouse 28) during operation of the header. In certain embodiments, the mounting hook 64 may also support the weight of the header 44 during operation. With the mounting hooks 64 positioned as in FIG. 8B, for example, the forward plate 58a of the support beam 56 may rest against the hooked end 82 of the mounting hook 64, with the hooked end 82 thereby supporting a portion of the weight of the header 44. The support beam 56 may also contact the mounting hook 64 at other locations (e.g., along the body 80 of the mounting hook 64) and may also contact the mounting hook 64 when the mounting hook 64 is disposed at other positions within the sleeve 66.

Figure 9:
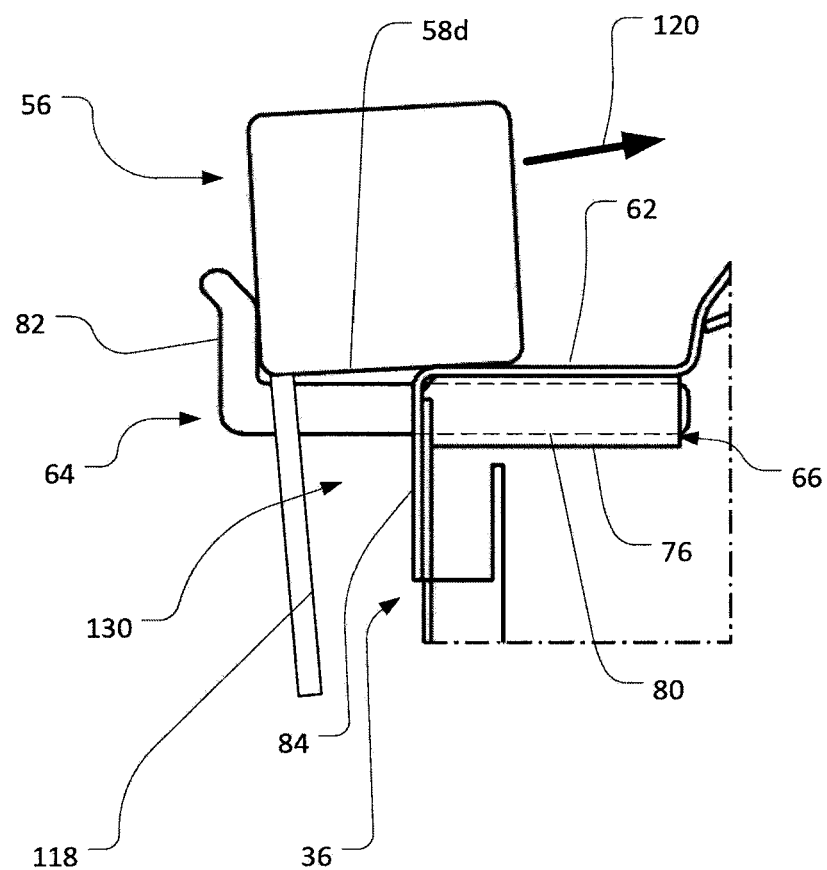
FIG. 9 is another schematic side view of the support beam of FIG. 2B supported by the feederhouse of FIG. 1.
Figure 10:
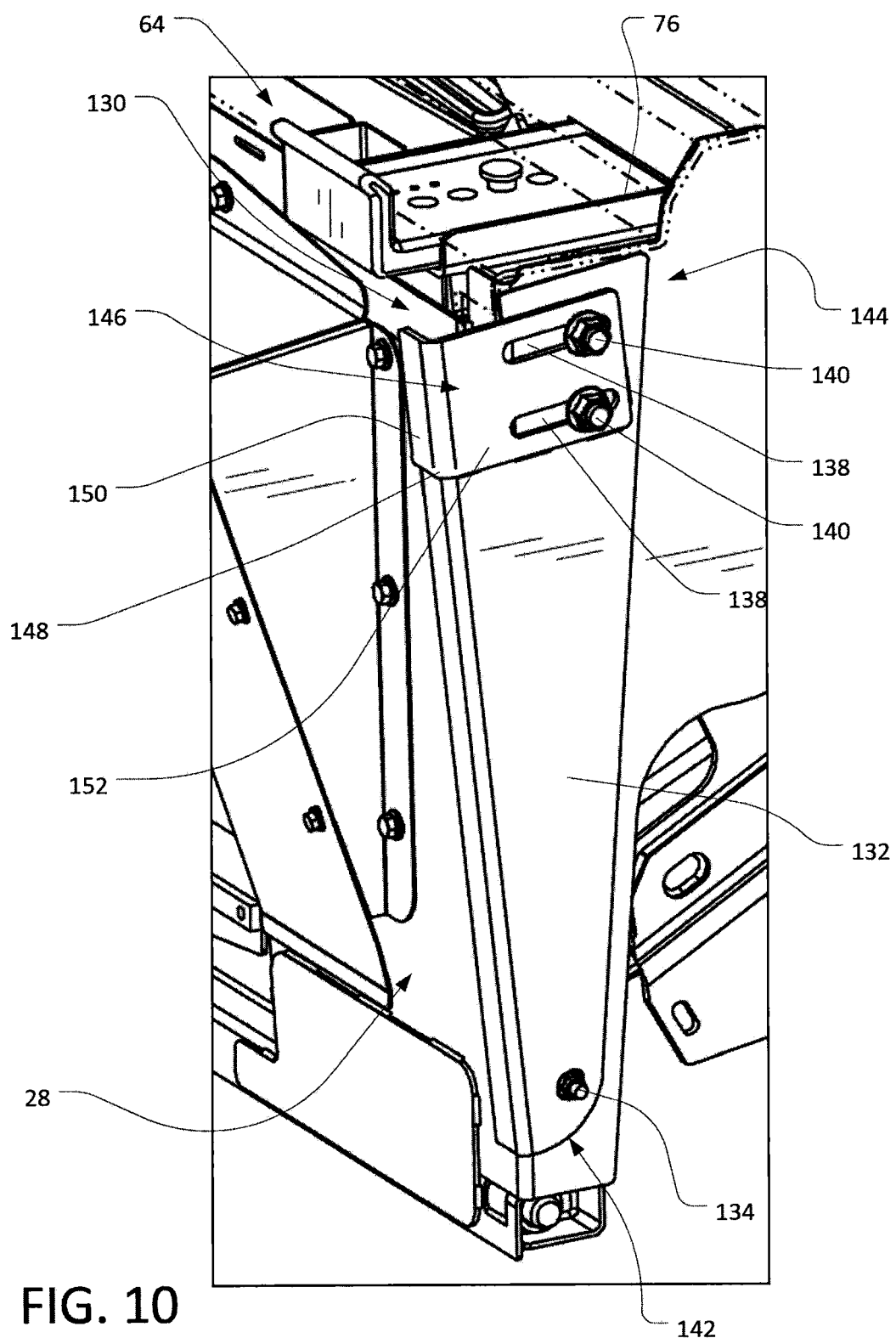
FIG. 10 is an enlarged partial perspective view of a side panel at the forward end of the feederhouse of FIG. 1.

In certain embodiments, supporting the header 44 on the feederhouse 28 at a particular angle may result in a gap being formed between the header 44 and the feederhouse 28. In FIG. 9, for example, the header 44 is disposed similarly to the configuration of FIG. 8A. It can be seen that with the header 44 supported in this way, a gap 130 is formed between a front face 118 of the header 44 and the forward end 36 of the feederhouse 28. Due to the particular configuration of the header 44 and the angle at which the header 44 is supported in FIG. 9, the gap 130 exhibits a particular size and shape. With the header 44 supported at a different angle (e.g., as depicted in FIG. 8A), a gap between the header 44 and the feederhouse 28 may exhibit a different size and shape than gap 130.

In certain embodiments, a side panel may be provided to block the gap 130 (in whole or in part) for various different sizes and shapes of the gap 130. Such a side panel may, for example, be configured to pivot with respect to the feederhouse 28, in order to allow adjustment of the panel for different gap sizes and shapes. In certain embodiments, a stop plate may also be provided, to protect against impacts between the header 44 and the feederhouse 28.

Referring again to FIG. 4, an example side panel 132 may be formed from a sheet metal or other material. The side panel 132 is attached to the feederhouse 28 at an attachment point 134 at a lower end 142 of the side panel 132, such that the side panel 132 may be pivoted about the attachment point 134, with respect to the feederhouse 28. The panel 132 may be attached at the attachment point 134, for example, using pins, bolts, screws, rivets, and so on. By pivoting the side panel 132 about the attachment point 134, the side panel 132 may accordingly be moved to cover the gap 130 (or another gap of a different size or shape). This may be useful, for example, to prevent crop material from being ejected through the gap 130 into the field and to prevent foreign objects from entering the gap 130.

In order to further secure the side panel 132 over the gap 130, the side panel 132 may also be attached to the feederhouse 28 at another location. As depicted, for example, two slots 138 are provided at an upper end 144 of the side panel 132. Two locking pins 140 may then be inserted through the slots 138 in order to lock the side panel 132 at a particular orientation with respect to the feederhouse 28. As depicted, the locking pins 140 are configured as bolts that may be inserted through the slots 138 and corresponding holes or slots (not shown) on the feederhouse 28, and then tightened to lock the side panel 132 to the feederhouse 28. In certain embodiments, other types of pins 140 or a different number of pins 140 and slots 138 may be utilized. In certain embodiments, the slots 138 may be disposed on the feederhouse 28 rather than on the side panel 132. In certain embodiments, a plurality of locking holes (not shown) similar to the holes 96 and 100 of the mounting hook 64 and the sleeve 66 may be provided, such that the side panel 132 may be locked in a number of discrete orientations, with respect to the feederhouse 28.

In certain embodiments, when the header 44 is supported by the feederhouse 28 for operation, the side panel 132 may be oriented such that a portion of the side panel 132 (e.g., the upper end 144 of the side panel 132) abuts the header 44. In this way, because the side panel 132 may be locked in place with respect to the feederhouse 28 (e.g., by the pins 140), the side panel 132 may protect the feederhouse 28 from impacts with the header 44. Further, by abutting the header 44, the side panel 132 may also prevent the header 44 from moving excessively on the feederhouse 28. For example, an impact of the header 44 on the ground during operation may tend to move the header 44 rearward and upward with respect to the feederhouse 28 (e.g., in the direction of arrow 120 in FIG. 9). Where the side panel 132 abuts the header 44, or is positioned to abut the header 44 in the event of a ground impact, the side panel 132 may resist the upward and rearward movement of the header 44 and thereby ensure that the header 44 remains correctly disposed for operation.

In certain embodiments, a stop plate 146 may be attached at the upper end 144 of the side panel 132, such the stop plate 146 abuts the header 44. Attaching a stop plate 146 may be useful, for example, to provide additional structural strength where the side panel 132 contacts the header 44. If the side panel 132 is formed from relatively thin sheet metal, for example, the stop plate 146 made from thicker gauge sheets may increase the structural strength of the upper end 144 of the side panel 132 in order to better resist movement of the header 44 due to ground (or other) impacts.

In the embodiment depicted, the stop plate 146 is configured as an L-shaped metal plate (i.e., a plate with a right-angle bend 148) that also includes the two slots 138. Accordingly, the stop plate 146 may include a contact portion 150 that may abut the header 44, and may also include a mounting portion 152 that may be locked to the feederhouse 28 with the pins 140.

In other embodiments, the stop plate 146 (or another stop plate) may be provided without the side panel 132. For example, in certain embodiments, the side panel 132 may not be used, but the stop plate 146 may still be attached to the feederhouse 28 using the slots 138.

In certain embodiments, a reinforcement plate (or similar structure) may be welded to the header 44 where the stop plate 146 abuts the header 44. A reinforcement plate may provide additional structural strength to the header 44 where the header 44 will contact the stop plate 146. A reinforcement plate may also be configured to present a particular surface (e.g., a plane surface) to the stop plate 146, such that contact forces between the header 44 and the stop plate 146 are appropriately managed. Referring again to FIG. 2A, for example, reinforcement plates 154 may be welded to the header 44 somewhat below the support beam 56, on either side of the outlet opening 46.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, components, operations, or arrangements, but do not preclude the presence or addition of one or more other features, components, operations or arrangements.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A feederhouse (28) for attaching a header (54) to an agricultural combine (20), the feederhouse comprising:
a sill plate (60) attached to the feederhouse, wherein the sill plate supports a support beam (56) of the header during operation of the header;
a mounting hook (64) with a hooked end (82), wherein the mounting hook is supported for forward and rearward movement with respect to the sill plate; and
a locking pin (124) configured to lock the mounting hook at either of a first position and a second position;
wherein, when the support beam is supported by the sill plate and the mounting hook is locked in the first position, the header is disposed at a first angle with respect to the feederhouse;
wherein, when the support beam is supported by the sill plate and the mounting hook is locked in the second position, the header is disposed at a second angle with respect to the feederhouse;
wherein, with the mounting hook in the first position, the hooked end of the mounting hook is disposed a first distance (108) forward of the sill plate;
wherein, with the mounting hook in the second position, the hooked end of the mounting hook is disposed a second distance forward (114) of the sill plate, wherein the second distance is longer than the first distance;
wherein, with the mounting hook in the first position and the header supported by the feederhouse for operation, a lower surface (58d) of the support beam is supported by an upper surface (62) of the sill plate with the lower surface of the support beam disposed in parallel with the upper surface of the sill plate; and
wherein, with the mounting hook in the second position and the header supported by the feederhouse for operation, the lower surface of the support beam is supported by the upper surface of the sill plate with the lower surface of the support beam disposed at an oblique angle with respect to the upper surface of the sill plate.

2. A feederhouse (28) for attaching a header (54) to an agricultural combine (20), the feederhouse comprising:
a sill plate (60) attached to the feederhouse, wherein the sill plate supports a support beam (56) of the header during operation of the header;
a mounting hook (64) with a hooked end (82), wherein the mounting hook is supported for forward and rearward movement with respect to the sill plate;
a locking pin (124) configured to lock the mounting hook at either of a first position and a second position; and
a sleeve (66) attached to the feederhouse, wherein the sleeve is configured to support the mounting hook at the first position and the second position;
wherein, when the support beam is supported by the sill plate and the mounting hook is locked in the first position, the header is disposed at a first angle with respect to the feederhouse;
wherein, when the support beam is supported by the sill plate and the mounting hook is locked in the second position, the header is disposed at a second angle with respect to the feederhouse; and
wherein the sleeve is disposed below the sill plate, and wherein an upper wall of the sleeve is formed by the sill plate.

3. A feederhouse (28) for attaching a header (54) to an agricultural combine (20), the feederhouse comprising:
a sill plate (60) attached to the feederhouse, wherein the sill plate supports a support beam (56) of the header during operation of the header;
a mounting hook (64) with a hooked end (82), wherein the mounting hook is supported for forward and rearward movement with respect to the sill plate;
a locking pin (124) configured to lock the mounting hook at either of a first position and a second position; and
a sleeve (66) attached to the feederhouse, wherein the sleeve is configured to support the mounting hook at the first position and the second position;
wherein, when the support beam is supported by the sill plate and the mounting hook is locked in the first position, the header is disposed at a first angle with respect to the feederhouse;
wherein, when the support beam is supported by the sill plate and the mounting hook is locked in the second position, the header is disposed at a second angle with respect to the feederhouse;
wherein a plurality of holes (96) extend through the mounting hook;
wherein a plurality of holes (100) extend through the sleeve; and
wherein disposing the locking pin within one of the holes through the mounting hook and one of the holes through the sleeve locks the mounting hook at one of the first position and the second position.

4. The feederhouse of claim 3, wherein two of the holes through the mounting hook are spaced from each other by a first distance (98), and two of the holes through the sleeve are spaced from each other by a second distance (102), wherein the first distance is different from the second distance.

5. The feederhouse of claim 4, wherein four of the holes through the mounting hook are spaced serially by the second distance.

6. The feederhouse of claim 1, wherein the mounting hook is angled forwardly at a tip (88) of the hooked end.

7. The feederhouse of claim 1, wherein with the header supported for operation by the mounting hook, a gap (130) is formed between the feederhouse and the header at a lateral side of the feederhouse; and wherein a side panel (132) is disposed at the lateral side of the feederhouse, the side panel being adjustable to block the gap when the header is disposed at either of the first angle or the second angle.

8. The feederhouse of claim 7, wherein a first end (142) of the side panel is attached to the feederhouse, such that the side panel can be pivoted with respect to the feederhouse to block the gap; and wherein a second locking pin (140) is configured to lock a second end (144) of the side panel in position, relative to the feederhouse.

9. The feederhouse of claim 7, wherein a stop plate (146) is attached to an end (144) of the side panel, the stop plate abutting the header when the header is supported by the feederhouse for operation.

10. The feederhouse of claim 9, wherein the stop plate is attached at an upper end of the side panel, and is configured with a right-angle bend.

11. The feederhouse of claim 1, wherein with the header supported for operation by the mounting hook, a gap (130) is formed between the feederhouse and the header at a lateral side of the feederhouse; and wherein a stop plate (146) is attached to the feederhouse, the stop plate extending across the gap to abut the header when the header is supported by the feederhouse for operation.

* * * * *